(12) United States Patent
Matsubara et al.

(10) Patent No.: US 8,778,222 B2
(45) Date of Patent: *Jul. 15, 2014

(54) LIQUID CRYSTALLINE POLYESTER COMPOSITION, METHOD OF PRODUCING THE SAME AND MOLDED PRODUCT MANUFACTURED FROM THE SAME

(75) Inventors: Satoshi Matsubara, Nagoya (JP); Hideyuki Umetsu, Nagoya (JP); Takayuki Hase, Naogya (JP)

(73) Assignee: Toray Industries, Inc. (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/637,742

(22) PCT Filed: Dec. 14, 2011

(86) PCT No.: PCT/JP2011/006984
§ 371 (c)(1),
(2), (4) Date: Sep. 27, 2012

(87) PCT Pub. No.: WO2012/090410
PCT Pub. Date: Jul. 5, 2012

(65) Prior Publication Data
US 2013/0015401 A1    Jan. 17, 2013

(30) Foreign Application Priority Data
Dec. 28, 2010 (JP) ................. 2010-292445

(51) Int. Cl.
| C09K 19/52 | (2006.01) |
| C09K 19/54 | (2006.01) |
| C09K 19/02 | (2006.01) |
| C09K 19/00 | (2006.01) |
| C08F 283/00 | (2006.01) |
| C08G 63/91 | (2006.01) |
| C08L 67/00 | (2006.01) |
| B60C 1/00 | (2006.01) |
| C08K 3/04 | (2006.01) |

(52) U.S. Cl.
USPC ............. 252/299.01; 252/299.5; 428/1.1; 349/183; 525/418; 524/495

(58) Field of Classification Search
USPC ............ 252/299.01, 299.5; 428/1.1; 349/183; 264/328.17; 524/495; 525/418
See application file for complete search history.

(56) References Cited

U.S. PATENT DOCUMENTS

| 4,161,470 A | 7/1979 | Calundann |
| 5,428,100 A | 6/1995 | Asai et al. |
| 2010/0230637 A1 | 9/2010 | Iwase et al. |
| 2010/0237284 A1 | 9/2010 | Watanabe et al. |
| 2013/0015400 A1 * | 1/2013 | Matsubara et al. ........ 252/299.5 |

FOREIGN PATENT DOCUMENTS

| JP | 54-077691 A | 6/1979 |
| JP | 6-240115 A | 8/1994 |
| JP | 2001-081336 A | 3/2001 |
| JP | 2002-294038 A | 10/2002 |
| JP | 2008-013600 A | 1/2008 |
| JP | 2008-239950 A | 10/2008 |
| JP | 2009-191088 A | 8/2009 |
| JP | 2009-215530 A | 9/2009 |
| JP | 4821927 B1 | 11/2011 |
| TW | 401454 | 5/1982 |
| TW | 200927890 | 7/2009 |
| TW | 201043684 | 12/2010 |

* cited by examiner

Primary Examiner — Geraldina Visconti
(74) Attorney, Agent, or Firm — DLA Piper LLP (US)

(57) ABSTRACT

A liquid crystalline polyester composition contains at least 100 parts by weight of liquid crystalline polyester and 10 to 100 parts by weight of glass fiber, wherein the glass fiber has a weight-average fiber length of 30 to 100 μm, and content of specific glass fiber having fiber length of 300 to 500 μm is 0.1 to 5 percent by weight to a total amount of the glass fiber.

12 Claims, 2 Drawing Sheets

LIQUID CRYSTALLINE POLYESTER COMPOSITION, METHOD OF PRODUCING THE SAME AND MOLDED PRODUCT MANUFACTURED FROM THE SAME

RELATED APPLICATIONS

This is a §371 of International Application No. PCT/JP2011/006984, with an international filing date of Dec. 14, 2011 (WO 2012/090410 A1, published Jul. 5, 2012), which is based on Japanese Patent Application No. 2010-292445, filed Dec. 28, 2010, the subject matter of which is incorporated by reference.

TECHNICAL FIELD

This disclosure relates to a liquid crystalline polyester composition, a method of producing the same and a molded product manufactured from the same.

BACKGROUND

In recent years, with increased demand for high-performance plastics, lots of polymers of various novel properties have been developed and come on the market. Liquid crystalline resins having characteristic parallel arrangement of molecular chains and showing optical anisotropy, such as liquid crystalline polyester, have received particular attention, because of their excellent moldability and mechanical properties, and their applications have been expanded to mechanical components and electric and electronic components. In particular, the liquid crystalline resins are favorably used for electric and electronic components requiring the high flowability, such as connectors.

With downsizing and refining the mechanical components and the electric and electronic components, molded products have ultra-thin wall thickness. Liquid crystalline polyester compositions filled with fibrous inorganic fillers have been used with an aim to improve the strength of the product and reduce the anisotropy.

Accompanied with reduction of the wall thickness of molded products, higher degrees of warpage reduction and dimensional accuracy have been demanded for materials. With the aim of improving anisotropy of molded products, the following liquid crystalline resin composition has been proposed (e.g., see JP H06-240115 A). This liquid crystalline resin composition is filled with 5 to 300 parts by weight of glass fiber having the average fiber diameter of 3 to 15 μm and the weight-average fiber length of 0.02 to 0.45 mm and satisfies the conditions that: (i) the ratio of specific glass fiber having the fiber length of greater than 1 mm is in the range of 0 to 8 percent by weight of the glass fiber; and (ii) the ratio of specific glass fiber having the fiber length of not greater than 0.1 mm is greater than 50 percent by weight of the glass fiber. The molded product obtained from this liquid crystalline resin composition, however, has the occurrence of filler lift that causes glass fiber to be lifted above the surface and accordingly has insufficient surface smoothness.

In the liquid crystalline resin composition, the high solidification rate of the liquid crystalline resin may cause long glass fibers dispersed in the composition to be present in the curved state. In the course of reflow of a molded product of this composition for surface mounting, the surface of the molded product is softened by heat, so that the curved glass fiber may be restored. This may cause the glass fibers near the surface to be lifted above the surface and thereby disadvantageously reduce the surface smoothness. Contact or slide between components during assembly of a molded product may cause peel-off or detachment of the filler of the liquid crystalline resin composition or the resin surface layer. Attachment of such peeled or detached pieces to the terminal may cause poor conduction, and attachment of such peeled or detached pieces to the lens may cause spots. The liquid crystalline polyester composition having the glass fiber length controlled to a specific range has accordingly been used. In many cases, pins are press-fit during assembly of connectors, so that the liquid crystalline resin composition has been required to have sufficient pin press-fit tolerance.

With the aim of preventing blister and reducing protrusion of glass fibers from the gate and from the fluid terminals, for example, one proposed liquid crystalline resin composition contains: (i) 5 to 50 percent by weight of glass fiber having the number-average fiber length of 50 to 120 μm and the content of the fiber length of 20 to 150 μm to be not lower than 80%; and (ii) 95 to 5 percent by weight of liquid crystalline polymer (e.g., see JP 2009-191088 A). With the aim of preventing filler detachment, one proposed resin molded product contains 5 to 250 parts by weight of fibrous filler having the fiber diameter of 5 to 15 μm and the number-average fiber length of 30 to 200 μm, relative to 100 parts by weight of liquid crystalline polymer (e.g., see JP 2008-239950 A). This proposed molded product, however, still has insufficient pin press-fit tolerance and insufficient warpage reduction.

To improve the weld strength and the surface smoothness of molded products, one proposed liquid crystalline resin composition contains 20 to 80 parts by weight of glass fiber having the maximum fiber length of not greater than 1000 μm and the weight-average fiber length of not less than 200 μm and not greater than 450 μm, relative to 100 parts by weight of liquid crystalline resin (e.g., see JP 2009-215530 A). This proposed resin composition, however, does not effectively prevent the filler lift and still gives the insufficient surface smoothness.

Recent size reduction and refinement of molded products requires satisfaction of the high degrees of surface smoothness, warpage reduction and pin press-fit tolerance. The conventional techniques, however, still does not sufficiently satisfy all these requirements. It could therefore be helpful to provide a liquid crystalline polyester composition that gives a molded product having high surface smoothness, high pin press-fit tolerance and less warpage.

SUMMARY

We thus provide:
(1) A liquid crystalline polyester composition, at least containing 100 parts by weight of liquid crystalline polyester and 10 to 100 parts by weight of glass fiber, wherein the glass fiber has a weight-average fiber length of 30 to 100 μm, and content of specific glass fiber having fiber length of 300 to 500 μm is 0.1 to 5.0 percent by weight to a total amount of the glass fiber.
(2) The liquid crystalline polyester composition described in (1), wherein a ratio (S1/S2) of total weight fraction (S1) of glass fiber having the fiber length of not less than a mode in a fiber length distribution of the glass fiber to total weight fraction (S2) of glass fiber having the fiber length of less than the mode is 3.0 to 6.0.
In the liquid crystalline polyester composition described in (1), however, the ratio (S1/S2) may be less than 3.0. In the liquid crystalline polyester composition described in (1), the ratio (S1/S2) may also be greater than 6.0.

(3) The liquid crystalline polyester composition described in either (1) or (2), wherein the liquid crystalline polyester has structural units (I), (II), (III), (IV) and (V) shown below:

The liquid crystalline polyester composition described in either (1) or (2), however, may not include at least part of the structural units (I), (II), (III), (IV) and (V) shown above.

(4) A method of producing the liquid crystalline polyester composition described in any of (1) to (3). The method melt-kneading at least liquid crystalline polyester and glass fiber by an extruder. The method controls a filling factor in the extruder to 60 to 90% during melt-kneading.

In the method of producing the liquid crystalline polyester composition described in any of (1) to (3), however, the filling factor in the extruder may be less than 60% or may be greater than 90%.

(5) A molded product manufactured by injection molding the liquid crystalline polyester composition described in any of (1) to (3).

The liquid crystalline polyester composition described in any of (1) to (3) may, however, be molded by another method.

(6) The molded product described in (5) that is used for a relay component.

The molded product described in (5) may, however, be used as a member other than the relay component.

The liquid crystalline polyester composition gives a molded product having excellent surface smoothness and pin press-fit tolerance and less warpage. The liquid crystalline polyester composition is favorably used for thin-wall electric and electronic components or mechanical components in complicated shapes and is especially useful for narrow-pitch connectors, camera module components and relay components and so on.

BRIEF DESCRIPTION OF THE DRAWINGS

FIG. 1 (A) schematically illustrates a cross section of one model state in which a glass fiber is present in the curved state in composition.

FIG. 1 (B) schematically illustrates a cross section of another model state in which a glass fiber is lifted above the surface of composition.

DESCRIPTION OF SYMBOLS

1 Glass fiber
2 Composition
G1 Submarine one-point gate
a Reference position (line A-B)
b Maximum deformation position

DETAILED DESCRIPTION

The liquid crystalline polyester composition contains 10 to 100 parts by weight of glass fiber having a specific fiber length relative to 100 parts by weight of liquid crystalline polyester.

The liquid crystalline polyester has structural units selected from the group including, for example, aromatic oxycarbonyl unit, aromatic and/or aliphatic dioxy units, and aromatic and/or aliphatic dicarbonyl units. This liquid crystalline polyester forms an anisotropic molten phase.

The aromatic oxycarbonyl unit may be structural unit derived from, for example, p-hydroxybenzoic acid or 6-hydroxy-2-naphthoic acid, and p-hydroxybenzoic acid is preferable. The aromatic and/or aliphatic dioxy unit may be structural unit derived from, for example, 4,4'-dihydroxybiphenyl, hydroquinone, 3,3',5,5'-tetramethyl-4,4'-dihydroxybiphenyl, t-butyl hydroquinone, phenyl hydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol or 1,4-butanediol, and 4,4'-dihydroxybiphenyl and hydroquinone are preferable. The aromatic and/or aliphatic dicarbonyl unit may be structural unit derived from, for example, terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-diphenyl ether dicarboxylic acid, adipic acid or sebacic acid, and terephthalic acid and isophthalic acid are preferable.

Concrete examples of the liquid crystalline polyester include: liquid crystalline polyester having structural unit derived from p-hydroxybenzoic acid and 6-hydroxy-2-naphthoic acid; liquid crystalline polyester having structural unit derived from p-hydroxybenzoic acid, structural unit derived from 6-hydroxy-2-naphthoic acid and structural unit derived from an aromatic dihydroxy compound, an aromatic dicarboxylic acid and/or an aliphatic dicarboxylic acid; liquid crystalline polyester having structural unit derived from p-hydroxybenzoic acid, structural unit derived from 4,4'-dihydroxybiphenyl and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from 4,4'-dihydroxybiphenyl, structural unit derived from hydroquinone and structural unit derived from an aromatic dicarboxylic acid, such as terephthalic acid or isophthalic acid and/or an aliphatic dicarboxylic acid, such as adipic acid or sebacic acid; liquid crystalline polyester having structural unit derived from p-hydroxybenzoic acid, structural unit derived from ethylene glycol and structural unit derived from terephthalic acid and/or isophthalic acid; liquid crystalline polyester having structural unit derived from p-hydroxybenzoic acid, structural unit derived from ethylene glycol, structural unit derived from 4,4'-dihydroxybiphenyl and structural unit derived from terephthalic acid and/or an aliphatic dicarboxylic acid, such as adipic acid or sebacic acid; liquid crystalline polyester having structural unit derived from p-hydroxybenzoic acid, structural unit derived from ethylene glycol, structural unit derived from an aromatic dihydroxy compound and structural unit derived from an aromatic dicarboxylic acid, such as terephthalic acid, isophthalic acid, or 2,6-naphthalenedicarboxylic acid; and liquid crystalline polyester having structural unit derived from 6-hydroxy-2-naphthoic acid, structural unit device from 4,4'-dihydroxybiphenyl and structural unit derived from 2,6-naphthalenedicarboxylic acid.

Among these liquid crystalline polyesters, liquid crystalline polyester having structural units (I), (II), (III), (IV) and (V) shown below is preferable. This liquid crystalline polyester has the low solidification rate and the improved resin adhesion, thus further enhancing the pin press-fit tolerance. Using this liquid crystalline polyester, in combination with the production method described later enables the fiber length of glass fiber contained in the liquid crystalline polyester composition to be more readily controlled to a desired range described later.

The structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit.

The content of the structural unit (I) is preferably 65 to 80 mole percent relative to the total amount of the structural units (I), (II) and (III). Specifically for the improved wettability with the glass fiber, the content of the structural unit (I) is more preferably 68 to 78 mole percent relative to the total amount of the structural units (I), (II) and (III).

The content of the structural unit (II) is preferably 55 to 85 mole percent relative to the total amount of the structural units (II) and (III). Specifically for the improved resin adhesion to increase the pin press-fit tolerance, the content of the structural unit (II) is more preferably 55 to 78 mole percent and most preferably 58 to 73 mole percent relative to the total amount of the structural units (II) and (III).

The content of the structural unit (IV) is preferably 50 to 95 mole percent relative to the total amount of the structural units (IV) and (V). Specifically for the improved resin adhesion to increase the pin press-fit tolerance, the content of the structural unit (IV) is more preferably 55 to 90 mole percent and most preferably 60 to 85 mole percent relative to the total amount of the structural units (IV) and (V).

The total amount of the structural units (II) and (III) is preferably equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition. An excess of dicarboxylic acid component or dihydroxy component may be added to control the polymer terminal groups.

The liquid crystalline polyester may be produced by a known polyester polycondensation method. For example, the following production methods are preferably employed:

(1) method of producing the liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing the liquid crystalline polyester by deacetylation polycondensation reaction after acylation of phenolic hydroxyl group by reaction of acetic anhydride with p-hydroxybenzoic acid, 4,4'-dihydroxybiphenyl, hydroquinone, terephthalic acid and isophthalic acid;

(3) method of producing the liquid crystalline polyester by dephenolation polycondensation reaction from p-hydroxybenzoic acid phenyl ester, 4,4'-dihydroxybiphenyl, hydroquinone, diphenyl terephthalate and diphenyl isophthalate; and (4) method of producing the liquid crystalline polyester by dephenolation polycondensation reaction with addition of aromatic dihydroxy compounds, such as 4,4'-dihydroxybiphenyl and hydroquinone after diphenyl esterification by reaction of specified amounts of diphenyl carbonate with p-hydroxybenzoic acid and aromatic dicarboxylic acids, such as terephthalic acid and isophthalic acid.

In the process of producing the liquid crystalline polyester by deacetylation polycondensation reaction, the melt polymerization method may preferably be employed to complete the polycondensation reaction under reduced pressure at a temperature at which the liquid crystalline polyester melts. For example, the following method may be employed. Specified amounts of p-hydroxybenzoic acid, 4,4'-dihydroxybiphenyl, hydroquinone, terephthalic acid, isophthalic acid and acetic anhydride are mixed in a reaction vessel equipped with stirring blades, a distillation pipe and a lower outlet. The mixture is heated with stirring in nitrogen atmosphere for acetylation of the hydroxyl group. The temperature of the reaction mixture is then further raised to the melting temperature of the liquid crystalline polyester, and the polycondensation reaction is completed under reduced pressure.

At a temperature at which the resulting polymer melts, the reaction vessel may be pressurized to, for example, about 1.0 kg/cm² (0.1 MPa). The resulting polymer may be discharged in the form of strands from the lower outlet of the reaction vessel. The melt polymerization method is advantageous to produce the homogeneous polymer and preferably gives the excellent polymer with less gas evolution.

The polycondensation reaction of the liquid crystalline polyester proceeds without a catalyst, but a metal compound, such as tin (II) acetate, tetrabutyl titanate, potassium acetate, sodium acetate, antimony trioxide, and metal magnesium may be used as the catalyst.

The contents of the respective structural units in the liquid crystalline polyester are calculable by the following procedure. The liquid crystalline polyester is weighted in an NMR (nuclear magnetic resonance) sample tube, is dissolved in a liquid crystalline polyester-soluble solvent (for example, pentafluorophenol/tetrachloroethane-$d_2$ mixture) and is subjected to $^1$H-NMR spectroscopy. The contents of the respective structural units are calculable from an area ratio of peaks corresponding to the respective structural units.

The melting point (Tm) is determinable with a differential scanning calorimeter by the following procedure. After observation of an endothermic peak temperature (Tm1) in measurement with heating the liquid crystalline polyester at a rate of 40° C./minute from room temperature, the temperature is sequentially maintained at Tm1+20° C. for 5 minutes, then decreased to room temperature at a rate of 20° C./minute, and increased again at a rate of 20° C./minute. An endothermic peak temperature (Tm2) observed during the re-heating process is determined as the melting point (Tm).

The melt viscosity of the liquid crystalline polyester is preferably 1 to 200 Pa·s and more preferably 10 to 200 Pa·s and further more preferably 10 to 100 Pa·s. The melt viscosity is measured with a Koka-type flow tester (constant-load orifice-type flow tester) at a shear rate of 1000/second under the temperature condition of the melting point of the liquid crystalline polyester+10° C.

The liquid crystalline polyester composition contains 10 to 100 parts by weight of glass fiber relative to 100 parts by weight of the liquid crystalline polyester. The glass fiber content of less than 10 parts by weight significantly lowers the mechanical structure, which results in the low pin press-fit tolerance of the resulting molded product. The content of the glass fiber contained in the liquid crystalline polyester composition is preferably not less than 20 parts by weight and is more preferably not less than 30 parts by weight. The glass fiber content of greater than 100 parts by weight, on the other hand, causes the poor surface smoothness. The glass fiber content of greater than 100 parts by weight also lowers the flowability of the liquid crystalline polyester composition and increases the pressure required for molding. This causes a stress to be applied to the resulting molded product, thereby lowering the pin press-fit tolerance and increasing the warpage. The glass fiber content in the liquid crystalline polyester composition is preferably not greater than 90 parts by weight and is more preferably not greater than 80 parts by weight.

In the liquid crystalline polyester composition, it is important to meet the requirements that (i) the glass fiber has weight-average fiber length of 30 to 100 μm and (ii) the content of specific glass fiber having the fiber length of 300 to 500 μm is 0.1 to 5.0 percent by weight to the total amount of glass fiber. The weight-average fiber length of the glass fiber of less than 30 μm causes the poor mechanical properties or more specifically lowers the pin press-fit tolerance of the molded product. The weight-average fiber length of the glass fiber is preferably not less than 40 μm and is more preferably not less than 50 μm. The weight-average fiber length of the glass fiber of greater than 100 μM, on the other hand, increases the number of glass fibers protruded from the surface of the molded product and thereby causes the poor surface smoothness. The weight-average fiber length of the glass fiber is preferably not greater than 95 μm and is more preferably not greater than 90 μm.

Even when the weight-average fiber length of the glass fiber is in the range of 30 to 100 μM, the content of the specific glass fiber having the fiber length of 300 to 500 μm of less than 0.1 percent by weight lowers the pin press-fit tolerance of the molded product and increases the warpage. Consequently, the content of the specific glass fiber having the fiber length of 300 to 500 μm is preferably not less than 0.3 percent by weight and is more preferably not less than 0.5 percent by weight. The content of the specific glass fiber having the fiber length of 300 to 500 μm of greater than 5.0 percent by weight, on the other hand, increases the number of glass fibers protruded from the surface of the molded product and thereby causes the poor surface smoothness. This content range also lowers the flowability of the liquid crystalline polyester composition and increases the pressure required for molding. This causes a stress to be applied to the resulting molded product, thereby lowering the pin press-fit tolerance and increasing the warpage. The content of the specific glass fiber having the fiber length of 300 to 500 μm is preferably not greater than 3.0 percent by weight and is more preferably not greater than 2.0 percent by weight.

In the fiber length distribution of the glass fiber contained in the liquid crystalline polyester composition, a ratio (S1/S2) of total weight fraction (S1) of glass fiber having the fiber length of not less than a mode to total weight fraction (S2) of glass fiber having the fiber gth of less than the mode is preferably 3.0 to 6.0. The ratio (S1/S2) equal to 1.0 means that the rate of the glass fiber having the greater fiber length than the mode is equal to the rate of the glass fiber having the smaller fiber length than the mode in the fiber length distribution. The greater value of the ratio (S1/S2), on the other hand, means the higher rate of the glass fiber having the greater fiber length than the mode in the fiber length distribution. The ratio (S1/S2) of not less than 3.0 further improves the mechanical strength and thereby the pin press-fit tolerance of the molded product. The ratio (S1/S2) is preferably not less than 3.5 and more preferably not less than 4.0. The ratio (S1/S2) of not greater than 6.0, on the other hand, has the high reinforcing effect on the molded product and further reduces the warpage. The ratio (S1/S2) is preferably not greater than 5.5 and more preferably not greater than 5.0.

The weight-average fiber length of the glass fiber and the content of the specific glass fiber having the fiber length of 300 to 500 μm are determinable by the following procedure. Ten grams of pellets composed of a composition containing liquid crystalline polyester and glass fibers are heated in the air at 550° C. for 8 hours for removal of the resin. The remaining glass fibers are observed with an optical microscope at 120-fold magnification, and the fiber length is measured with respect to 1000 or more glass fibers selected at random. The weight-average fiber length is given by $(\Sigma ni \cdot Li^2)/(\Sigma ni \cdot Li)$, where Li represents the range (division) of the fiber length of the glass fiber and ni is calculated by (the number of glass fibers having the fiber length in the range Li)/(the total number of measured glass fibers). The content of the specific glass fiber having the fiber length of 300 to 500 μm (percent by weight) is given by $(\Sigma na \cdot La)/(\Sigma ni \cdot Li) \times 100$, where La represents the range (division) of the fiber length of the glass fiber included in the range of 300 to 500 μm, and na is calculated by (the number of glass fibers having the fiber length in the range La)/(the total number of measured glass fibers).

The ratio (S1/S2) of the total weight fraction (S1) of glass fiber having the fiber length of not less than the mode to the total weight fraction (S2) of glass fiber having the fiber length of less than the mode was calculated from a histogram of the fiber length of the glass fiber.

The liquid crystalline polyester composition may contain fibrous filler other than the glass fiber or another type of filler other than the fibrous filler in a specific range that does not damage our films. The fibrous filler may be, for example, carbon fiber, aromatic polyamide fiber, potassium titanium fiber, plaster fiber, brass fiber, stainless steel fiber, steel fiber, ceramic fiber, boron whisker fiber or asbestos fiber. Another type of filler other than the fibrous filler may be the powdery, granular or plate-like inorganic filler, such as talc, graphite, calcium carbonate, glass bead, glass microballoon, clay, wollastonite, titanium oxide or molybdenum disulfide. Two or more of these fillers may be used in combination.

The liquid crystalline polyester composition may additionally contain any of the following general additives and other thermoplastic resins in a specific range that does not damage the films to provide specific properties: antioxidants and heat stabilizers (e.g., hindered phenol, hydroquinone, phosphites and their substitutes), UV absorbers (e.g., resorcinol, salicylate, benzotriazole and benzophenone), lubricants and mold release agents (e.g., montanic acid and its salts, its esters and its half esters, stearyl alcohol, stearamide and polyethylene wax), coloring agents including dyes (e.g., Nitrosine) and pigments (e.g., cadmium sulfide, phthalocyanine and carbon black), plasticizers and antistatic agents.

The liquid crystalline polyester composition may be obtained, for example, by melt-kneading the liquid crystalline polyester, the glass fiber and the other components as needed basis. Melt-kneading may be performed at the temperature of 200 to 350° C., for example, with a Banbury mixer, a rubber roller, a kneader, a single-screw extruder or a twin-screw extruder. To knead the glass fiber homogeneously with high dispersibility, the extruder is preferable, the twin-screw extruder is more preferable, and the twin-screw extruder with an intermediate supply port is further more preferable.

The following methods, for example, may be employed to control the weight-average fiber length of the glass fiber contained in the liquid crystalline polyester composition and the content of the specific glass fiber having the fiber length of 300 to 500 μm to the desired ranges described above. More specifically, one available method may blend glass fibers of different fiber lengths and supply the blended glass fibers to the extruder. Another available method may supply one type of such glass fibers together with the liquid crystalline polyester from a supply port located on the extruder drive system side, while supplying the other type of the glass fibers from an intermediate supply port. The glass fibers of different fiber lengths may be, for example, a combination of milled fiber and glass fiber and more specifically a combination of the milled fiber having the weight-average fiber length of 30 to 80 μm and the chopped strand having the average cut length of 3 to 4 mm.

Another available method may blend pellets of the liquid crystalline polyester composition containing the milled fibers with pellets of the liquid crystalline polyester composition filled with the chopped strand glass fibers and supply the blended pellets to the extruder. Yet another available method may supply one type of such pellets together with the liquid crystalline polyester from the supply port located on the extruder drive system side, while supplying the other type of the pellets from the intermediate supply port.

Other available methods include a method of adjusting the degree of breakage of glass fiber by screw arrangement and a method of adjusting the degree of breakage of glass fiber by controlling the shear force applied to the glass fiber. The shear force may be controlled, for example, by adjusting the screw rotation speed or the cylinder temperature to regulate the melt viscosity of the molten resin.

When the extruder is used for melt-kneading, a filling factor in the extruder is preferably set to 60 to 90%. The filling factor is defined as a ratio of the volume of the kneaded object, such as resin composition, in the internal space of the extruder to the volume of the internal space of the extruder. The filling factor in the extruder differs at the measurement positions in the extruder. The filling factor of a specific area in the extruder is given as a ratio of the volume of the resin composition in the specific area to the volume calculated by subtracting the total volume of a screw shaft and a screw element from the internal volume of an extruder cylinder in the specific area. The resin filling factor is equal to 100% when the internal space of the specific area is fully filled with the resin composition. The filling factor depends on the supply rate (process rate) of the resin component and the screw rotation speed of the extruder. In general, the filling factor increases with an increase in ratio (Q/Ns) of supply rate (Q) of the resin component to screw rotation speed (Ns).

The filling factor (f) is approximated by the following equation:

$$f = Q \times t / (V \times 1.38)$$

where V represents the spatial volume of the screw slot of the extruder; Q represents the supply rate; t represents the residence time of the molten resin in this part; and the specific gravity of the liquid crystalline polyester is 1.38. The "filling factor" in the extruder indicates the filling factor in the entire inside of the extruder from the supply port located on the extruder drive system side to the end of the extruder, from which the melt-kneaded resin composition is discharged.

Setting the filling factor to be not less than 60% ensures adequate breakage of the glass fiber and thereby enables the distribution of the glass fiber contained in the resulting liquid crystalline polyester composition to be readily controlled to the desired ranges. More specifically, the distribution of the glass fiber can be readily controlled to the weight-average fiber length of not greater than 100 μm and the content of the specific glass fiber having the fiber length of 300 to 500 μm to or below 5.0 percent by weight. This results in further improving the surface smoothness of the molded product. Such setting also increases the flowability of the liquid crystalline polyester composition, thus further improving the pin press-fit tolerance of the molded product and further reducing the warpage. The filling factor is preferably not less than 65% and more preferably not less than 68%.

Setting the filling factor to be not greater than 90%, on the other hand, adequately controls the degree of breakage of the glass fiber and thereby enables the distribution of the glass fiber contained in the liquid crystalline polyester composition to be readily controlled to the desired ranges. More specifically, the distribution of the glass fiber can be readily controlled to the weight-average fiber length of not less than 30 μm and the content of the specific glass fiber having the fiber length of 300 to 500 μm to or above 0.1 percent by weight. This results in further improving the pin-press-fit tolerance of the molded product and further reducing the warpage. The filling factor is preferably not greater than 85% and more preferably not greater than 78%.

The weight-average fiber length of the glass fiber as the material of melt-kneading is preferably 50 to 3000 μm. Melt-kneading the glass fiber having the weight-average fiber length of not less than 50 μm enhances the reinforcing effect on the molded product and further reduces the warpage. The weight-average fiber length of the glass fiber is more preferably not less than 60 μm and is further more preferably not less than 70 μm. Melt-kneading the glass fiber having the weight-average fiber length of not greater than 3000 μm, on the other hand, enables the content of the specific glass fiber having the fiber length of 300 to 500 μm to be readily controlled to or below 5.0 percent by weight in the liquid crystalline polyester composition. This results in further improving the surface smoothness of the molded product. The weight-average fiber length of the glass fiber is more preferably not greater than 2000 μm and is further more preferably not greater than 1000 μm.

The number-average fiber diameter of the material glass fiber is preferably 3 to 20 μm. Setting the number-average fiber diameter to be not less than 3 μm enhances the reinforcing effect on the molded product and further reduces the warpage of the molded product. The number-average fiber diameter of the glass fiber is more preferably not less than 5 μm and is further more preferably not less than 7 μm. Setting the number-average fiber diameter to be not greater than 20 μm, on the other hand, ensures adequate breakage of the glass fiber and thereby enables the content of the specific glass fiber having the fiber length of 300 to 500 μm to be readily controlled to or below 5.0 percent by weight in the liquid crystalline polyester composition. This results in further improving the surface smoothness of the molded product. The number-average fiber diameter of the glass fiber is more preferably not greater than 17 μm and is further more preferably not greater than 15 μm.

The contents of the glass fiber and the other additives contained in the liquid crystalline polyester composition obtained by the above process are generally equal to the amounts added for production of the liquid crystalline polyester composition.

The liquid crystalline polyester composition may be formed to various molded products by any of known molding methods. The preferable molding method is injection molding the liquid crystalline polyester composition, because of its excellent thin-wall flowability.

The resulting molded product has the excellent surface smoothness and pin press-fit tolerance and the less warpage and is thus favorably used for composite molded products with metals. The composite molded product with metal may be used, for example, for electric and electronic components, such as various gears, various casings, sensors, LED components, liquid crystal backlight bobbins, connectors, sockets, resistors, relay cases, relay spools and bases, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components (plasma, organic EL and liquid crystal), irons, hair dryers, rice cooker components, microwave oven components, acoustic components, audio equipment components for audios, laserdiscs and compact disks, lighting components, refrigerator components, and air conditioner components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, motor insulators for air conditioners, hot air flow control valves, brush holders for radiator motors, water pump impellers, turbine vanes, wiper motor components, distributors, starter switches, starter relays, transmission wire harnesses, windshield washer fluid nozzles, air conditioner panel switch plates, fuel solenoid valve coils, fuse connectors, ECU connectors, horn terminals, electric component insulators, step motor rotors, lamp sockets, lamp reflectors, lamp housings, brake pistons, solenoid bobbins, engine oil filters and ignition cases. Film applications of the composite molded product include films for magnetic recording media. Sheet applications include door trim, shock-absorbing materials for the bumper and the side frame, seat materials, pillars, fuel tanks, brake hoses, windshield washer fluid nozzles and air conditioner refrigerant tubes. Because of its excellent surface appearance, the composite molded product is favorably applicable to slide components, such as camera module components, optical pickup lens holders and auto focus camera lens modules.

The molded product having the excellent pin press-fit tolerance and the excellent surface smoothness is favorably used for relay cases and relay components, such as relay spools and bases among the above applications, and is especially favorable for power relays, I/O relays, clean relays, latching relays, ratchet relays, solid-state relays and printed circuit board relays.

This molded product is not restricted to the composite molded products with metals described above but is effectively useful for film applications, such as photo films, capacitor films, electrical insulating films, wrapping films, drawing films, and ribbon films and sheet applications, such as car interior ceiling, pad materials for the instrument panel and sound absorbing pads for the hood back.

EXAMPLES

The advantageous effects are described more in detail with reference to examples. The composition analysis and the property evaluation of the liquid crystalline polyester were performed by the following methods:

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 μl of a solvent (pentafluorophenol/1,1,2,2,-tetrachloroethane-$d_2$=65/35 w/w % mixture), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition of the liquid crystalline polyester was analyzed from the ratio of the areas of peaks corresponding to the respective structural units observed in the spectral range of 7 to 9.5 ppm.

(2) Measurement of Melting Points (Tm) of Liquid Crystalline Polyester and Liquid Crystalline Polyester Composition The melting points (Tm) of the liquid crystalline polyester and the liquid crystalline polyester composition were measured by the following method with differential scanning calorimeter DSC-7 (manufactured by PerkinElmer, Inc). After observation of an endothermic peak temperature (Tm1) in measurement with heating the liquid crystalline polyester or the liquid crystalline polyester composition at a rate of 40° C./minute from room temperature, the temperature was sequentially maintained at Tm1+20° C. for 5 minutes, was then decreased to room temperature at a rate of 20° C./minute, and was increased again at a rate of 20° C./minute. An endothermic peak temperature (Tm2) observed during the re-heating process at the rate of 20° C./minute was determined as the melting point (Tm).

(3) Measurement of Melt Viscosity of Liquid Crystalline Polyester

The melt viscosity was measured under the conditions of the temperature set to the melting point of the liquid crystalline polyester+10° C. and the shear rate of 1000/s by Koka-type flow tester CFT-500D (orifice: 0.5φ×10 mm) (manufactured by Shimadzu Corporation).

The following shows liquid crystalline polyesters and glass fibers used in respective Examples and Comparative Examples.

(A) Liquid Crystalline Polyester

Reference Example 1

Synthesis of Liquid Crystalline Polyester (A-1)

In a 5 L reaction vessel with stirring blades and a distillation pipe, 870 grams (6.30 moles) of p-hydroxybenzoic acid, 327 grams (1.89 moles) of 4,4'-dihydroxybiphenyl, 89 grams (0.81 moles) of hydroquinone, 292 grams (1.76 moles) of terephthalic acid, 157 grams (0.95 moles) of isophthalic acid and 1367 grams of acetic anhydride (1.03 equivalents of the total amount of phenolic hydroxyl group) were mixed, were reacted with stirring in nitrogen atmosphere at 145° C. for 2 hours and were then heated to 320° C. in 4 hours. With keeping the polymerization temperature at 320° C., the reaction vessel was depressurized to 1.0 mmHg (133 Pa) in 1.0 hour and the reaction further proceeded for another 90 minutes. The polycondensation was terminated when the torque required for stirring reached 15 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-1).

This liquid crystalline polyester (A-1) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). This liquid crystalline polyester (A-1) contained 70 mole percent of p-oxybenzoate unit (structural unit (I)) relative to the total amount of p-oxybenzoate unit (structural unit (I)), 4,4'-dioxybiphenyl unit (structural unit (II)) and 1,4-dioxybenzene unit (structural unit (III)). This liquid crystalline polyester (A-1) contained 70 mole percent of 4,4'-dioxybiphenyl unit (structural unit (II)) relative to the total amount of 4,4'-dioxybiphenyl unit (structural unit (II)) and 1,4-dioxybenzene unit (structural unit (III)). This liquid crystalline polyester (A-1) contained 65 mole percent of terephthalate unit (structural unit (IV)) relative to the total amount of terephthalate unit (structural unit (IV)) and isophthalate unit (structural unit (V)). The total amount of 4,4'-dioxybiphenyl unit (structural unit (II)) and 1,4-dioxybenzene unit (structural unit (III)) was 23 mole percent relative to the total amount of the structural units. The total amount of terephthalate unit (structural unit (IV)) and isophthalate unit (structural unit (V)) was 23 mole percent relative to the total amount of the structural units. The melting point (Tm) of this liquid crystalline polyester (A-1) was 314° C. The melt viscosity measured at the temperature of 324° C. and the shear rate of 1000/s with the Koka-type flow tester (orifice of 0.5φ×10 mm) was 20 Pa·s.

Reference Example 2

Synthesis of Liquid Crystalline Polyester (A-2)

In a polymerization vessel, 994 grams (7.20 moles) of p-hydroxybenzoic acid, 181 grams (0.97 moles) of 4,4'-dihydroxybiphenyl, 161 grams (0.97 moles) of terephthalic acid, 159 grams (0.83 moles) of polyethylene terephthalate having the intrinsic viscosity of about 0.6 dl/g and 1026 grams of acetic anhydride (1.10 equivalents of the total amount of phenolic hydroxyl group) were mixed, were reacted with stirring in nitrogen atmosphere at 145° C. for 2 hours and were then heated to 335° C. in 4 hours. The reaction mixture was stirred for another 20 minutes with keeping the polymerization temperature at 335° C. and increasing the pressure to 0.1 MPa with nitrogen. Then the reaction vessel was depressurized to 1.0 mmHg (133 Pa) in 1.0 hour and the reaction then proceeded for another 90 minutes. The polycondensation was terminated when the torque required for stirring reached 12 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-2).

This liquid crystalline polyester contained 66.7 mole percent of p-oxybenzoate unit (structural unit (I)), 9.0 mole percent of 4,4'-dioxybiphenyl unit (structural unit (II)), 7.7 mole percent of polyethylene terephthalate-derived ethylene dioxy unit and 16.6 mole percent of terephthalate unit (structural unit (IV)) and had the melting point (Tm) of 326° C. The melt viscosity measured at the temperature of 335° C. and the shear rate of 1000/s with the Koka-type flow tester (orifice of 0.5φ×10 mm) was 13 Pa·s.

Reference Example 3

Synthesis of Liquid Crystalline Polyester (A-3)

According to JP S54-77691A, in a reaction vessel with stirring blades and a distillation pipe, 921 parts by weight of p-acetoxybenzoic acid and 435 parts by weight of 6-acetoxynaphthoic acid were mixed and polycondensated. The resulting liquid crystalline polyester (A-3) had 57 mole equivalents of p-acetoxybenzoic acid-derived structural unit (structural unit (I)) and 22 mole equivalents of 6-acetoxynaphthoic acid-derived structural unit and the melting point (Tm) of 283° C. The melt viscosity measured at the temperature of 293° C. and the shear rate of 1000/s with the Koka-type flow tester (orifice of 0.5φ×10 mm) was 30 Pa·s.

(B) Glass Fiber
  (B-1) "milled fiber EPG140M-10A" manufactured by Nippon Electric Glass Co., Ltd. (number-average fiber length of 140 μm, number-average fiber diameter of 9 μm);

(B-2) "milled fiber EPG70M-01N" manufactured by Nippon Electric Glass Co., Ltd. (number-average fiber length of 70 μm, number-average fiber diameter of 9 μm); and (B-3) "chopped strand ECS03 T-747H" manufactured by Nippon Electric Glass Co., Ltd. (number-average fiber length of 3.0 mm, number-average fiber diameter of 10.5 μm).

The properties were evaluated by the following methods:

(1) Glass Fiber Length in Liquid Crystalline Polyester Composition

Ten grams of pellets of the liquid crystalline polyester compositions obtained in respective Examples and Comparative Examples were heated in the air at 550° C. for 8 hours for removal of the resin. The remaining glass fibers were observed with an optical microscope at 120-fold magnification, and the fiber length was measured at 120-fold magnification with respect to 1000 or more glass fibers selected at random. The weight-average fiber length is given by $(\Sigma ni \cdot Li^2)/(\Sigma ni \cdot Li)$, where Li represents the range (division) of the fiber length of the glass fiber and ni is calculated by (the number of glass fibers having the fiber length in the range Li)/(the total number of measured glass fibers). The content of the specific glass fiber having the fiber length of 300 to 500 μm (percent by weight) is given by $(\Sigma na \cdot La)/(\Sigma ni \cdot Li) \times 100$, where La represents the range (division) of the fiber length of the glass fiber included in the range of 300 to 500 μm, and na is calculated by (the number of glass fibers having the fiber length in the range La)/(the total number of measured glass fibers). The ratio (S1/S2) of the total weight fraction (S1) of glass fiber having the fiber length of not less than the mode to the total weight fraction (S2) of glass fiber having the fiber length of less than the mode was obtained from a histogram of the fiber length of the glass fiber.

(2) Pin Press-Fit Tolerance

Each of the liquid crystalline resin compositions obtained in respective Examples and Comparative Examples was injection molded to a pin press-fit test piece by FANUC ROBOSHOT α-30C (manufactured by FANUC Corporation). The conditions of the injection molding were the cylinder temperature set to the melting point of the liquid crystalline polyester composition+10° C. and the die temperature of 90° C. A pin press-fit test piece of 3 mm in thickness with 20 square holes of 1.5 mm×1.5 mm at 2.8 mm pitch was obtained by the injection molding. A brass square bar of 1.6 mm×1.6 mm was inserted in each of the square holes of the obtained test piece, and the number of cracked square holes was counted.

(3) Surface Smoothness

Figure 1A:
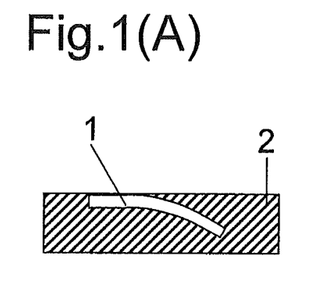
Figure 1B:
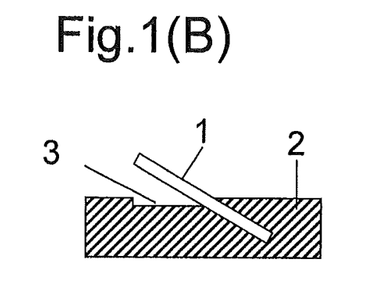

Each of the liquid crystalline resin compositions obtained in respective Examples and Comparative Examples was injection molded to a rod-like molded product by FANUC ROBOSHOT α-30C (manufactured by FANUC Corporation). The conditions of the injection molding were the cylinder temperature set to the melting point of the liquid crystalline polyester composition+10° C. and the die temperature of 90° C. A rod-like molded product (length: 150.0 mm, width: 12.7 mm, thickness: 0.5 mm, side gate: 0.5 mm×5.0 mm) was obtained by the injection molding. After the obtained molded product was treated in an oven (SPH (trademark) manufactured by ESPEC CORP.) at 260° C. for 3 minutes, a specific area of 10.0 mm in length×10.0 mm in width, the center located of 20.0 mm away from the counter-gate end of the molded product, was observed at 100-fold magnification by scanning electron microscope (SEM) ("JSM-6360LV" manufactured by JEOL LTD). A glass fiber 1 that was not present in the curved state in composition 2 as shown in FIG. 1(A) but was lifted above the surface of composition 2 as shown in FIG. 1(B) was detected as "glass fiber lift." The presence or the absence of glass fiber lift in the specific area was observed. The molded product with zero glass fiber lift was evaluated as "excellent" (double circle); the molded product with one to five glass fiber lifts was evaluated as "good" (circle); and the molded product with six or more glass fiber lifts was evaluated as "poor" (cross).

(4) Warpage

Figure 2:
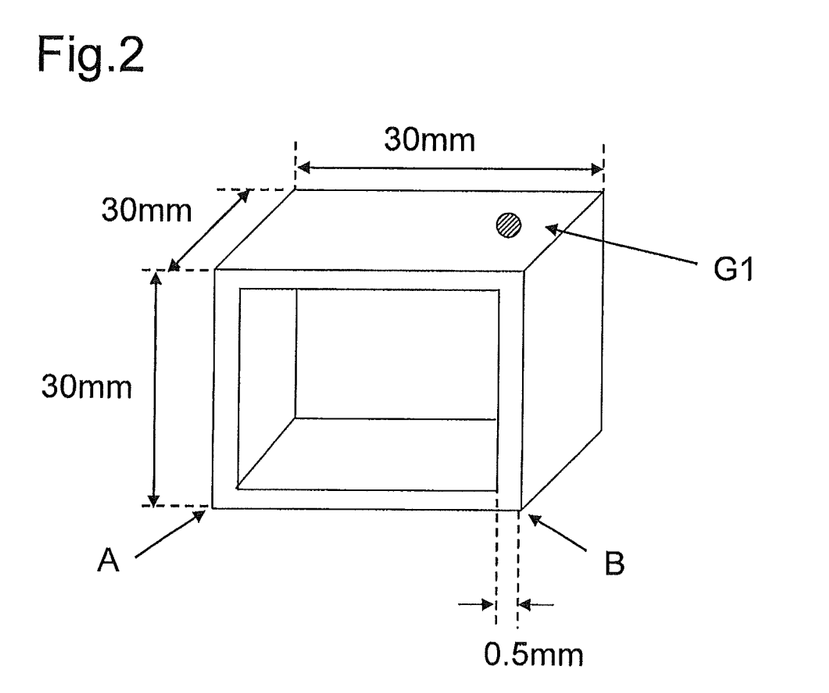
FIG. 2 is a perspective view illustrating a box-shaped molded product used for evaluation of warpage according to the example.
Figure 3:
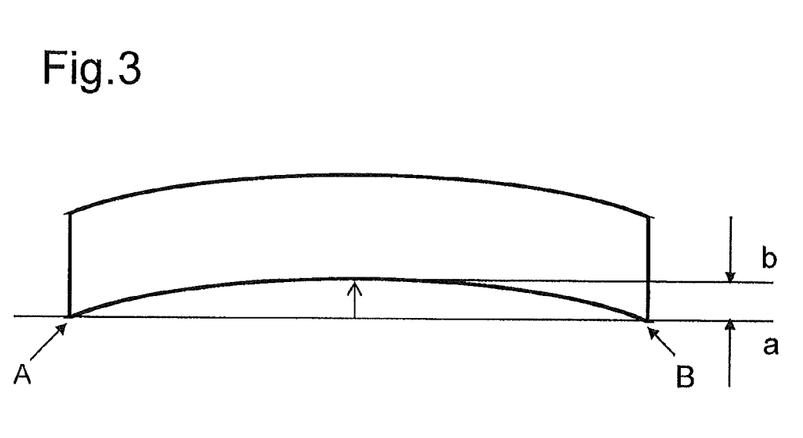
FIG. 3 is a conceptual view illustrating measurement sites of warpage in the box-shaped molded product of the example.

Each of the liquid crystalline polymer compositions obtained in respective Examples and Comparative Examples was injection molded to a box-shaped molded product by FANUC ROBOSHOT α-30C (manufactured by FANUC Corporation). The conditions of the injection molding were the cylinder temperature set to the melting point of the liquid crystalline polyester composition+10° C. and the die temperature of 90° C. An open-bottomed, box-shaped molded product of 30 mm in length×30 mm in width×30 mm in height×0.5 mm in thickness with a submarine one-point gate G1 on the side face shown in FIG. 2 was obtained by the injection molding. FIG. 3 is a conceptual view illustrating measurement sites of warpage in the box-shaped molded product, where symbols A and B represent the positions A and B in FIG. 2. Distance between a reference position "a" on the line A-B on the surface opposite to the gate surface and a maximum deformation position "b" was measured as "inward warpage."

Examples 1 to 9

A co-rotation twin-screw extruder with rotary vent having a screw diameter of 44 mm (TEX-44 manufactured by the Japan Steel Works, LTD., spatial volume (V) of 1590 cm³) was used for extrusion molding. Each specified amount of liquid crystalline polyester (A) shown in Table 1 was added from a hopper of the twin-screw extruder, while each specified amount of glass fiber (B) shown in Table 1 relative to a total of 100 parts by weight of the liquid crystalline resin was added from an intermediate supply port of the twin-screw extruder. The mixture was melt-kneaded at the cylinder temperature set to the melting point of the liquid crystalline polyester (A) +10° C. to pellets of liquid crystalline polyester composition. The filling factor in the entire inside of the extruder from the supply port located on the extruder drive system side to the end of the extruder, from which the melt-kneaded polymer composition is discharged, was approximated by the following equation, $$f = Qxt / (V \times 1.38)$$

where V represents the spatial volume of the screw slot of the extruder; Q represents the supply rate; t represents the residence time of the molten resin in the entire inside of the extruder; and the specific gravity of the liquid crystalline polyester is 1.38.

The obtained pellets were dried with hot air and were evaluated for the pin press-fit tolerance, the surface smoothness and the warpage by the methods described above. The results of evaluation are shown in Table 1.

Comparative Examples 1 to 6

Pellets were obtained in the same manner as Examples 1 to 9, except the composition and the extrusion conditions shown in Table 1, and were evaluated for the number of cracked press-fits, the surface smoothness and the warpage reduction. The results of evaluation are shown in Table 1.

TABLE 1

| | (A) Liquid Crystalline Polyester (100 parts by weight) | (B) Glass Fiber Content (parts by weight) | | | Extrusion Conditions | | | | Weight- Ave. Fiber Length | Glass Fiber Length Content of Glass Fiber of 300 to 500 μm | S1/S2 | Pin Press-Fit Tolerance Number of Cracked Press-Fits | Surface Smoothness Number of Filler Lifts | | Warpage Inward Warpage |
|---|---|---|---|---|---|---|---|---|---|---|---|---|---|---|---|
| | | B-1 | B-2 | B-3 | Supply Rate kg/h | Screw Rotation Speed rpm | Residence Time min. | Filling Factor % | μm | wt % | — | pieces | pieces | Eval. | mm |
| EX 1 | A-1 | 50 | 0 | 0 | 40 | 200 | 2.5 | 76 | 78 | 1.2 | 4.5 | 0 | 0 | ⊚ | 1 |
| EX 2 | A-1 | 0 | 50 | 0 | 40 | 200 | 2.5 | 76 | 63 | 0.9 | 4.8 | 0 | 0 | ⊚ | 2 |
| EX 3 | A-1 | 25 | 0 | 0 | 40 | 200 | 2.5 | 76 | 86 | 1.5 | 4.1 | 1 | 0 | ⊚ | 2 |
| EX 4 | A-1 | 80 | 0 | 0 | 40 | 200 | 2.5 | 76 | 62 | 0.6 | 3.6 | 0 | 2 | ○ | 2 |
| EX 5 | A-1 | 50 | 0 | 0 | 60 | 200 | 1.9 | 87 | 64 | 0.7 | 3.8 | 2 | 2 | ○ | 2 |
| EX 6 | A-1 | 50 | 0 | 0 | 60 | 300 | 1.4 | 64 | 97 | 2.8 | 5.2 | 2 | 3 | ○ | 1 |
| EX 7 | A-1 | 30 | 0 | 20 | 40 | 200 | 2.5 | 76 | 93 | 4.5 | 3.3 | 5 | 6 | ○ | 4 |
| EX 8 | A-2 | 50 | 0 | 0 | 40 | 200 | 2.5 | 76 | 98 | 3.7 | 3.2 | 3 | 5 | ○ | 4 |
| EX 9 | A-3 | 50 | 0 | 0 | 40 | 200 | 2.5 | 76 | 38 | 0.2 | 2.3 | 6 | 7 | ○ | 5 |
| Comp. EX 1 | A-1 | 50 | 0 | 0 | 20 | 200 | 3.3 | 50 | 128 | 9.2 | 2.6 | 10 | 15 | X | 6 |
| Comp. EX 2 | A-1 | 0 | 50 | 0 | 80 | 200 | 1.6 | 95 | 55 | 0 | 6.3 | 12 | 1 | ○ | 5 |
| Comp. EX 3 | A-2 | 50 | 0 | 0 | 20 | 200 | 3.3 | 50 | 132 | 10.5 | 1.5 | 16 | 18 | X | 6 |
| Comp. EX 4 | A-3 | 50 | 0 | 0 | 20 | 200 | 3.3 | 50 | 139 | 8.8 | 1.8 | 12 | 26 | X | 7 |
| Comp. EX 5 | A-1 | 5 | 0 | 0 | 40 | 200 | 2.5 | 76 | 131 | 8.6 | 3.5 | 14 | 20 | X | 8 |
| Comp. EX 6 | A-1 | 150 | 0 | 0 | 40 | 200 | 2.5 | 76 | 56 | 0.2 | 2.2 | 10 | 28 | X | 7 |

As clearly shown in Table 1, compared with the liquid crystalline polyester compositions of Comparative Examples 1 to 6, the liquid crystalline polyester compositions of Examples 1 to 9 have the more excellent pin press-fit tolerance and surface smoothness and the less warpage.

The invention claimed is:

1. A liquid crystalline polyester composition comprising at least 100 parts by weight of liquid crystalline polyester and 10 to 100 parts by weight of glass fiber, wherein
   the glass fiber has a weight-average fiber length of 30 to 100 μm, and
   content of specific glass fiber having fiber length of 300 to 500 μm is 0.1 to 5.0 percent by weight to a total amount of the glass fiber.

2. The liquid crystalline polyester composition according to claim 1, wherein
   a ratio (S1/S2) of total weight fraction (S1) of glass fiber having the fiber length of not less than a mode in a fiber length distribution of the glass fiber to total weight fraction (S2) of glass fiber having the fiber length of less than the mode is 3.0 to 6.0.

3. The liquid crystalline polyester composition according to claim 1, wherein
   the liquid crystalline polyester has structural units (I), (II), (III), (IV) and (V):

(I)

(II)

(III)

(IV)

(V)

4. A method of producing the liquid crystalline polyester composition according to claim 1, comprising
   melt-kneading at least liquid crystalline polyester and glass fiber by an extruder, and
   melt-kneading with a filling factor in the extruder of 60 to 90%.

5. A molded product manufactured by injection molding the liquid crystalline polyester composition according to claim 1.

6. A relay component comprising the molded product according to claim 5.

7. The liquid crystalline polyester composition according to claim 2, wherein
   the liquid crystalline polyester has structural units (I), (II), (III), (IV) and (V)

(I)

(II)

(III)

-continued (IV)

(V)

8. A method of producing the liquid crystalline polyester composition according to claim 2, comprising
melt-kneading at least liquid crystalline polyester and glass fiber by an extruder, and
melt-kneading with a filling factor in the extruder of 60 to 90%.

9. A method of producing the liquid crystalline polyester composition according to claim 3, comprising
melt-kneading at least liquid crystalline polyester and glass fiber by an extruder, and
melt-kneading with a filling factor in the extruder of 60 to 90%.

10. A method of producing the liquid crystalline polyester composition according to claim 7, comprising
melt-kneading at least liquid crystalline polyester and glass fiber by an extruder, and
melt-kneading with a filling factor in the extruder of 60 to 90%.

11. A molded product manufactured by injection molding the liquid crystalline polyester composition according to claim 2.

12. A relay component comprising the molded product according to claim 11.

* * * * *